June 7, 1966 G. J. BAUCH ETAL 3,254,752
DIVERTING CONVEYOR SYSTEM
Filed Sept. 16, 1963 4 Sheets-Sheet 1
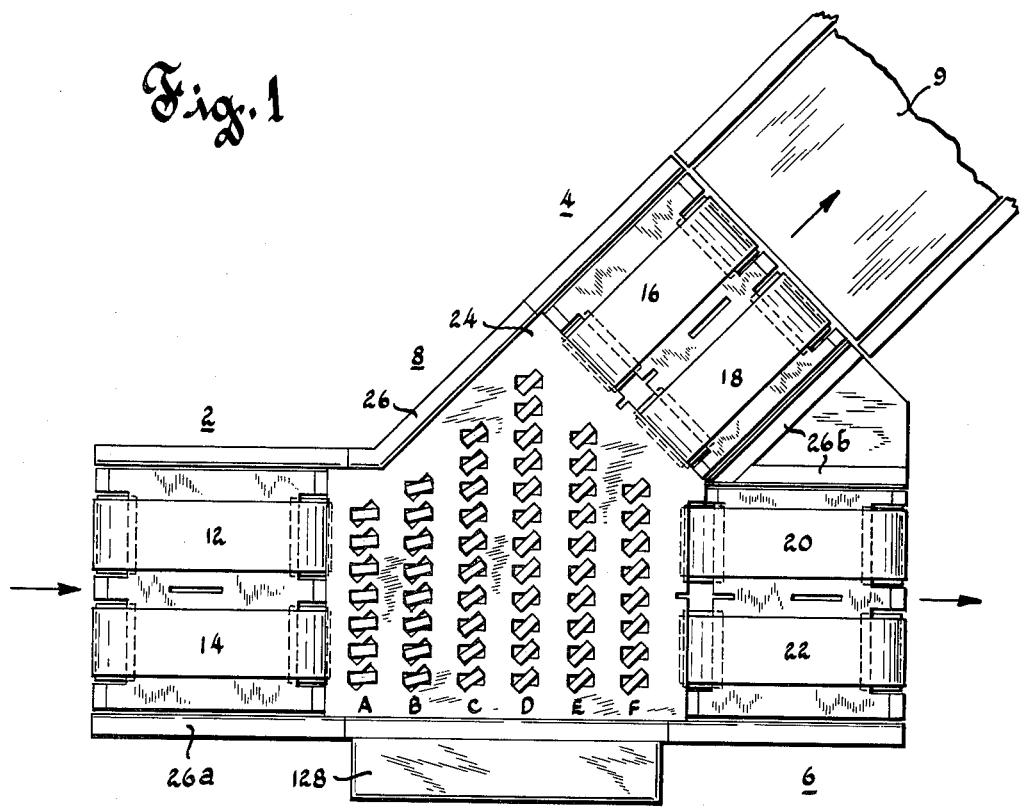
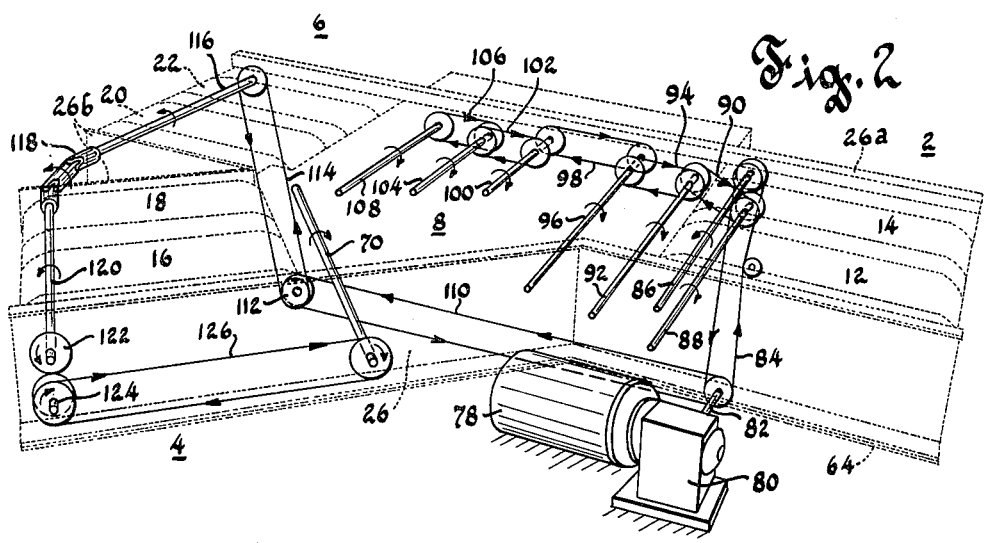

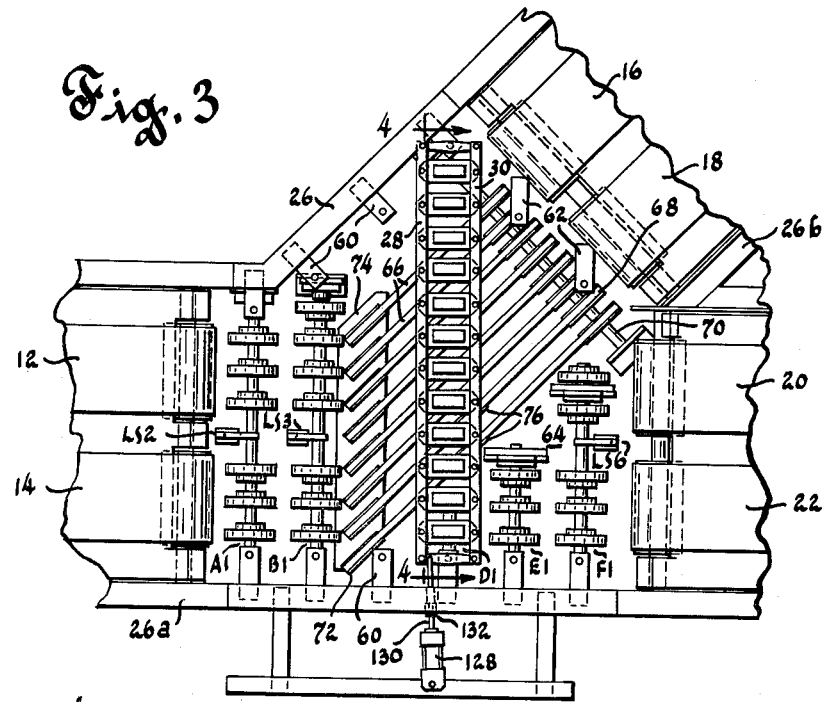
Fig. 3
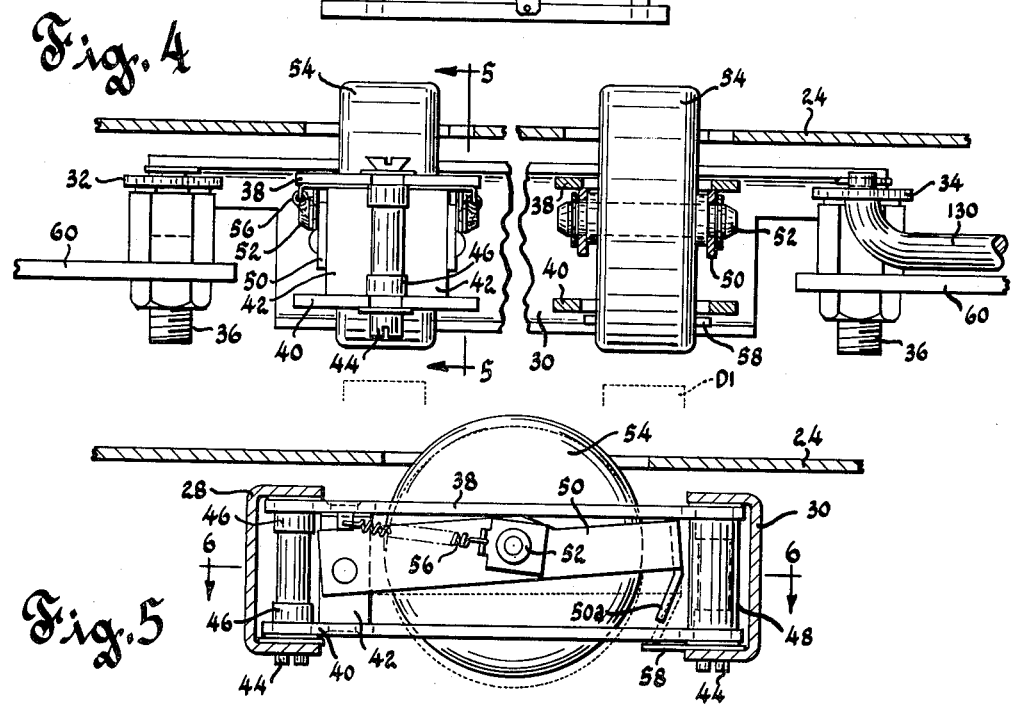
Fig. 4
Fig. 5

Inventors
George J. Bauch
Kenneth H. Hansen
John M. Holzer
Howard R. St. Cyr
By Wm. A. Autio
Attorney

United States Patent Office 3,254,752
Patented June 7, 1966

3,254,752
DIVERTING CONVEYOR SYSTEM
George J. Bauch, Wauwatosa, Kenneth H. Hansen, Elm Grove, John M. Holzer, West Allis, and Howard R. St. Cyr, Milwaukee, Wis., assignors to Cutler-Hammer, Inc., Milwaukee, Wis., a corporation of Delaware
Filed Sept. 16, 1963, Ser. No. 309,119
13 Claims. (Cl. 198—31)

This invention relates to diverting conveyor systems and more particularly to article conveyors of the branched type capable of receiving articles and for selectively delivering them through either one of two branch outlets and for automatically changing the delivery of articles to the other branch outlet when the first branch outlet is incapable of receiving them.

While not limited thereto, the invention is especially applicable to conveyance and overflow diversion of articles such as untied stacks of newspapers or the like.

An object of the invention is to provide an improved diverting conveyor system.

A more specific object of the invention is to provide a branched conveyor section with improved means for delivering received articles from a selected one of a plurality of branch outlets thereof.

Another specific object of the invention is to provide such branched conveyor section with improved means for delivering received articles from one branch outlet thereof and for switching the delivery of articles to another branch outlet whenever the article receiver at the first branch outlet cannot handle the articles fast enough.

Another specific object of the invention is to provide such branched conveyor section with improved means for switching the delivery of articles from a first branch outlet to an overflow branch outlet whenever the articles are not being discharged from the first branch outlet as fast as they are received and for switching the delivery of articles back to the first branch outlet when the latter again becomes effective to discharge the articles at the received rate.

Other objects and advantages of the invention will hereinafter appear.

These and other objects and advantages of the invention and the manner of obtaining them will best be understood by reference to the following description of an embodiment thereof taken in conjunction with the accompanying drawings, wherein:

FIGURE 1 is a top plan view of a branched conveyor section and diverting mechanism constructed in accordance with the invention;

FIG. 2 is an isometric view showing schematically drive mechanism for the device of FIG. 1;

FIG. 3 is a fragmentary top view with certain parts removed showing drive apparatus for the diverting mechanism of FIG. 1;

FIG. 4 is a partial cross-sectional view taken along line 4—4 of FIG. 3;

FIG. 5 is a cross-sectional view taken along line 5—5 of FIG. 4;

Figure 6:
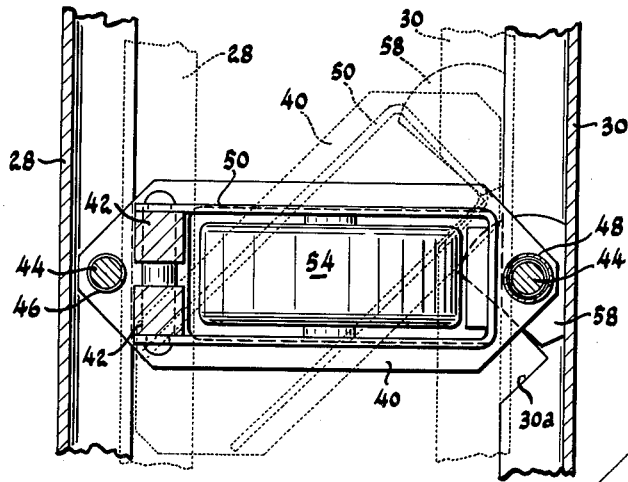
FIG. 6 is a cross-sectional view taken along line 6—6 of FIG. 5.

Referring to FIG. 1, there is shown a branched conveyor section comprising a receiving end portion 2 and a branched discharge end having a pair of outlet portions 4 and 6. The conveyor section is provided with a diverting mechanism 8 at the junction between the receiving portion and the outlet portions for diverting articles to either outlet portion 4 or 6. Means such as conveyors 9 and 10 shown adjacent outlet portions 4 and 6 in FIG. 7 may be provided for conveying articles discharged from each branch outlet. An incoming conveyor 11 feeds articles onto receiving portion 2.

As shown in FIG. 1, the receiving end portion 2 of the conveyor secion is provided with means for supporting and conveying articles to diverting mechanism 8. This means comprises a pair of endles conveyor belts 12 and 14 driven in unison at first ends thereof by a driving roll or the like and having their other ends moving over an idler roll so that articles which are received on the belts are moved in the direction of the arrow. Branch outlet portions 4 and 6 are provided with similar pairs of driven, endless belts 16, 18 and 20, 22 for discharging articles from the respective outlet portions. While receiving end portion 2 and outlet portions 4 and 6 are shown as being provided with pairs of conveyor belts, it will be apparent that other suitable article moving means such as driven rollers or the like could be used in place thereof. For exemplary purposes, outlet portion 6 is shown as being in line with receiving portion 2 so that articles may pass straight through the conveyor section. Outlet portion 4 is shown as being at a 45-degree angle to the left relative to outlet section 6, that is, at a 135-degree angle relative to receiving portion 2 so that articles may be diverted from the linear path. It will be apparent that some angle other than 45 degrees may be used for outlet portion 4.

Diverter mechanism 8 comprises a plurality of rows such as six rows A–F of diverter wheels in parallel arrangement between receiving portion 2 and outlet portions 4 and 6. Each of these rows of diverter wheels is arranged straight across the straight through path between receiving end portion 2 and outlet portion 6. As shown in FIG. 1, the first seven wheels in the rows are arranged in alinement with corresponding wheels in the other rows and rows B–F are provided with variable numbers of additional wheels extending into the angular portion of outlet portion 4. That is, row B is provided with 8 wheels, row C is provided with 10 wheels, row D is provided with 12 wheels, row E is provided with 10 wheels and the last row F is provided wth 8 wheels. Diverter mechanism 8 is provided with a cover plate 24 through which the upper peripheral portions of the wheels extend from below through respective apertures shaped so that the wheels may be turned left from a straight ahead position up to a 45-degree angle toward branch outlet portion 4. The conveyor section including portions 2, 4 and 6 and diverting mechanism 8 is provided with a suitable supporting frame comprising side channel members 26, 26a and 26b mounted on legs which rest on the floor and onto which the various structural parts are mounted.

It may be assumed that the rows of diverter wheels are normally in one or the other of their positions. Assuming that the diverter wheels are normally set in angular positions for passing articles from receiving portion 2 to angular outlet portion 4 this condition will persist as long as the articles can be disposed of at the rate at which they are delivered. If a jam occurs of if a tying machine or the like or a feeder which feeds articles to a tying machine does not accept the articles at the delivery rate so that the articles bunch up on the conveyor 9 or outlet portion 4, the delivery of further articles will automatically be switched to outlet 6 by turning rows A–F of diverter wheels to their straight ahead position in a predetermined order. This predetermined order is arranged so that the next article or stack of newspapers reaching the diverter mechanism will go straight ahead rather than to the angular outlet portion but the immediately preceding article which had been started on its turn toward the angular outlet portion will continue to the latter. The articles will then be conveyed straight ahead to outlet portion 6 which may be considered an overflow outlet until the angular outlet portion has been cleared to the extent that it can again receive articles. When this condition occurs, the diverter wheels will be restored to their former angular position in a predetermined order. This order is such that any article which was started straight ahead will continue to outlet portion 6 whereas subsequent articles will go to outlet portion 4. The automatic controls for performing the aforementioned operations will be described in more detail hereinafter following description of the driving means for the diverter wheels.

FIGS. 3–6 show the structural details of a row of diverter wheels. These diverters are of the skate-wheel type and are modified forms of the skate-wheel diverter shown in R. J. Byrnes et al. Patent No. 3,058,567, dated October 16, 1962.

As shown in FIGS. 3–6, each row of diverter wheels for each diverter unit is provided with a supporting structure in the nature of an actuable, link type parallelogram comprising a pair of spaced apart, elongated and substantially shallow channel-shaped side members 28 and 30 and a pair of substantially shorter flat end members 32 and 34. Each side member 28 and 30 has a horizontal U-shaped configuration in transverse cross-section as more clearly shown in FIG. 5 providing upper and lower spaced apart flanges extending parallel to one another from the vertical yoke portion thereof. Side members 28 and 30 are arranged in spaced apart relation as shown in FIGS. 3, 5 and 6, so that the flanges of member 28 extend horizontally toward the flanges of member 30. The opposite end portions of the upper flanges of members 28 and 30 are provided with round holes extending vertically therethrough, and the opposite ends of end members 32 and 34 are provided with similar holes in alinement with the respective holes on the upper flanges of members 28 and 30. The upper flanges of members 28 and 30 rest on the respective ends of the end members 32 and 34 and the four members are pivotally secured to one another at their ends by suitable means such as bolts or the like extending through the pairs of alined holes to form an actuatable parallelogram. Each end member 32 and 34 is provided at its mid-portion with a round hole for accommodating a bearing bolt 36 for supporting the same for rotation about a vertical axis as hereinafter described in connection with FIG. 4. The upper and lower flanges of side members 28 and 30 are also provided with a plurality of equally spaced holes with each such hole in the upper flange of each member being in vertical alinement with a corresponding hole in the associated lower flange of each member to provide opposed pairs of holes in the two side members for pivotally supporting in parallel relation a plurality of wheel assemblies therebetween as hereinafter described.

As shown in FIGS. 5 and 6, each wheel assembly is provided with upper and lower spaced apart supporting brackets 38 and 40, respectively. Each such bracket is flat and has a generally rectangular configuration with the four corners thereof cut off at angles of substantially 45 degrees so that the opposite edges of each end of each bracket converge toward one another and terminate in spaced apart relation at the end of the bracket. These converging edges are provided at each end of each bracket to avoid interference between these brackets and side members 28 and 30 when the diverter unit is actuated to an angular position as shown in dotted lines in FIG. 6. Brackets 38 and 40 are rigidly secured to one another in vertically spaced apart relation by a pair of horizontally spaced parallel rivets 42 extending therebetween near one end as shown in FIGS. 5 and 6. Each such rivet is provided with reduced round end portions affording a pair of spaced apart shoulders for spacing brackets 38 and 40 from one another. The corresponding reduced end portions of rivets 42 extend through pairs of holes in brackets 38 and 40, the holes of each such bracket being in laterally spaced apart relation and being also spaced from the end of the associated bracket. The reduced end portions of rivets 42 are externally riveted to rigidly secure brackets 38 and 40 to one another to form a bracket assembly.

A pivot pin 44 shown in FIGS. 5 and 6, extends through each aperture in the lower flanges in side members 28 and 30 to a point slightly short of the upper flanges of the side members and is provided at its upper end with a coaxial tapped hole for threadedly receiving a screw extending through the corresponding alined hole in the upper flange. The extreme ends of brackets 38 and 40 are provided with alined holes for receiving pin 44 therethrough to pivotally support the opposite ends of the bracket assembly between the upper and lower flanges of side members 28 and 30. Pivot pin 44 may be provided with pairs of suitable sleeve-type bearings 46 of nylon or the like to facilitate pivoting of the wheel assembly relative to the side members 28 and 30. Bearings 46 are provided with suitable flanges entering between brackets 38 and 40 and the flanges on the associated side members 28 and 30 to prevent sliding of the bearings on the pivot pins. Rivets 42 maintain one end of brackets 38 and 40 rigidly spaced from one another. The pivot pin 44 at the other end of the brackets is provided with a spacing sleeve 48 to maintain the other ends of the brackets similarly spaced from one another.

As shown in FIGS. 4, 5 and 6, a generally horizontal U-shaped lever 50 extends between bracket 38 and 40 and is pivotally supported on rivets 42. For this purpose, each rivet 42 is provided with a transverse hole substantially at the mid-portion thereof, the holes of each pair of rivets being in alinement for receiving a pivot pin extending therethrough. This pivot pin is provided with a substantially enlarged midportion extending through the holes in the rivets and reduced end portions extending through substantially smaller holes in the free end portions of the legs of lever 50 thereby to pivotally support lever 50 for restricted pivotal movement between brackets 38 and 40. The mid-portions of the two legs of lever 50 are provided with alined holes for receiving a rod 52 for supporting wheel 54 for free rotation on a horizontal axis between the legs of lever 50.

Two helical tension springs 56, one of which is shown in FIG. 5, are connected between bracket 38 and rod 52 to normally resiliently bias diverter wheel 54 into its upper position wherein the yoke end of lever 50 stops against upper brackets 38. For this purpose, suitable connecting members are rigidly secured to the lower surfaces of bracket 38 and to rod 52 as shown in FIG. 5 to facilitate securing of the end hooks of springs 56 therebetween.

As shown in FIGS. 5 and 6, brackets 38 and 40 are provided centrally thereof with alined generally rectangular apertures to provide clearance for the upper and lower portions of wheel 54, which portions of the wheel extend through their respective apertures. The yoke portion of lever 50 is provided with an angular, depending, inwardly-bent portion 50a for engaging a stop member 58 shown in FIGS. 5 and 6 when the diverter wheels are in their straight-ahead position thereby to prevent depression of diverter wheels 54 below the level shown in dotted lines in FIG. 5 and to prevent engagement of the wheel with driving means positioned therebelow as hereinafter described. The lower flange of member 30 is provided with a notch 30a for each diverter wheel that is desired to be driven from below in its angular position. As will be apparent, such notches 30a permit the wheels to be depressed by the bundles into frictional engagement with the driving belts mounted therebelow.

Stop members 58 are provided for those wheels which are not to be driven in their straight ahead positions. The inwardly bent portion 50a of bracket 50 also provides a cam surface for engaging stop member 58 to cause the diverting wheel to be raised when the diverter unit is actuated from its angular position to its straight-ahead position.

As shown in FIGS. 3 and 4, a plurality of brackets 60 extend inwardly from the side frame members of the conveyor section. Those brackets 60 may be rigidly secured at one end to flanges on the side channel members of the frame. The other ends of the brackets extend inwardly and are provided with holes for supporting the opposite ends of the diverter units.

As shown in FIG. 4, supporting bolts 36 are rigidly secured to brackets 60 by pairs of nuts or the like, and pivotally support at their upper ends the mid-portions of end members 32 and 34 of the diverter units.

Brackets 62 shown in FIG. 3 which support corresponding ends of diverter units or rows of wheels E and F are rigidly secured to upstanding posts located adjacent the inner ends of conveyor belts 16 and 18. The lower ends of these posts are rigidly secured to the bottom plate or panel 64 of the conveyor section. As shown in dotted lines in FIG. 2, bottom panel 64 at its edges abuts the lower flanges of the frame channel members 26, 26a and 26b and may be rigidly secured to the latter by bolts or the like.

FIGS. 2 and 3 show driving means for the diverting wheels for frictionally engaging the lower peripheries of the diverting wheels when they are depressed by moving articles to cause rotation thereof to move the articles. These driving means are mounted between the side channel members of the frame above bottom panel 64. These driving means comprise a plurality of rows of driving wheels A1, B1, D1, E1 and F1 for driving some of the diverting wheels in rows A, B, D, E and F, respectively, and a plurality of angularly arranged, parallel driving belts 66 for driving other wheels in rows C, D, E and F. As shown in FIG. 3, row A1 is provided with six driving wheels, the center driving wheel being omitted to provide space for a limit switch LS2 which is actuated by the center diverter wheel in the corresponding row A when such center diverter wheel is depressed by an article entering thereon. It will be apparent that only the three wheels on each end of diverter wheel row A are driven and that the center diverter wheel is used for switch actuation as hereinafter described.

In a similar manner, row B1 is provided with seven driving wheels although the diverter unit driven thereby has eight diverter wheels to provide a space for mounting a limit switch LS3 in alinement with the aforementioned switch LS2 in place of the fourth driving wheel. These switches have been placed below the fourth diverter wheel so that they are substantially centered with respect to the receiving end portion of the conveyor section and therefore are assured of being actuated by arriving articles.

Row D1 is provided with two driving wheels immediately adjacent straight ahead side channel member 26a of the conveyor section to leave room for angularly arranged driving belts 66. The next row E1 is provided with three driving wheels mounted beneath the first three diverter wheels in row E. The last row F1 is provided with five driving wheels and a limit switch LS6 mounted in the space beyond the third driving wheel directly beneath the fourth diverter wheel in row F.

The driving wheels in each row are rigidly secured in spaced relation along a rotary shaft by suitable means such as set screws or the like extending through the hub of the wheel. These driving wheel supporting shafts are journaled for rotation in bearings at each end thereof. In the case of row A1 of driving wheels, the shaft bearings are secured to side channel members 26 and 26a of the conveyor frame. The bearings for first ends of the shafts for rows B1, D1, E1 and F1 are secured to frame member 26a and the bearings for the other ends of these shafts are secured to upstanding brackets mounted on bottom plate 64 of the conveyor section.

As shown in FIG. 3, eight V-belts 66 are arranged parallel to one another and colinearly with outlet portion 4 for driving some of the diverter wheels in their angular positions. These belts are driven by eight pulleys 68 rigidly secured to a shaft 70. Shaft 70 is journaled for rotation in a pair of bearings, one of which is secured to the side frame member 26 of outlet portion 4 and the other of which is secured to an upstanding bracket mounted on the bottom plate of the conveyor section adjacent the inner end of conveyor belt 20. The other ends of V-belts 68 run over eight idler pulleys 72. These idler pulleys 72 are journaled for rotation between a series of upstanding brackets 74 mounted on the bottom plate of the conveyor section and arranged in a row approximately beneath row C of diverter wheels. Additional idler pulleys 76 may be provided for the longer ones of the V-belts to support the mid-portions thereof and to maintain frictional engagement with rows D and E of diverter wheels.

As shown in FIG. 2, an electric motor 78 provides power for the conveyor section. Motor 78 is coupled through a reduction gear mechanism 80 to a drive shaft 82 having a pair of sprockets thereon. The shafts for the aforementioned driving wheels and V-belts are also provided with sprockets whereby they are driven as will become apparent. As shown in FIG. 2, drive shaft 82 is coupled through a chain 84 to a drive shaft 86 for conveyor belts 12 and 14. Shaft 86 is provided with a gear in mesh with a gear on a reversing shaft 88. This reversing shaft 88 is required to obtain the proper direction of rotation for the wheels which drive the diverter wheels. Shaft 88 is coupled by a chain 90 to shaft 92 for rotating row A1 of driving wheels. Shaft 92 is coupled through a chain 94 to shaft 96 for rotating row B1 of driving wheels. Shaft 96 is coupled through a chain 98 to shaft 100 for rotating row D1 of driving wheels. Shaft 100 is coupled through a chain 102 to shaft 104 for rotating row E1 of driving wheels. And shaft 104 is coupled through a chain 106 to shaft 108 for rotating row F1 of driving wheels. It will be apparent from the foregoing that the rows of driving wheels rotate all the rows of diverter wheels in the same direction to convey articles in the forward direction.

Drive shaft 82 is also coupled through a chain 110 to a first one of a pair of sprockets 112, the other sprocket being coupled through a chain 114 to shaft 116 for driving conveyor belts 20 and 22 in outlet portion 6. Shaft 116 is connected through a universal joint 118 to a shaft 120 for driving conveyor belts 16 and 18 in outlet portion 4. Shaft 120 is provided with a gear 122 in mesh with a gear on shaft 124, the latter being coupled through a chain 126 for rotating shaft 70 which drives the V-belts 66. As indicated by the arrows in FIG. 2, this arrangement provides the proper directions of rotation for all the driven parts of the conveyor section.

As shown in FIGS. 1 and 3, suitable actuators 128 are provided for the respective diverter units or rows A–F of diverter wheels. These actuators are preferably electrical solenoid operated, compressed air actuators, one of which is shown in FIG. 3. These actuators 128 are cylinders provided with pistons actuated by compressed air from a suitable source and are provided with solenoid-operated valves for admitting compressed air into the cylinders to actuate the pistons in opposite directions. Each piston is connected through an actuating rod 130 shown in FIGS. 3 and 4 to an end bracket 34 of the diverter unit. When the rod is retracted, the diverter wheels are moved to their angular position. When the rod is extended, the diverter wheels are moved back to their straight ahead position. Rods 130 are each provided with an adjustable collar 132 thereon which may be adjusted along the rod by a set screw or the like. It will be apparent that such collar abuts against the inner end of cylinder 128 to limit the amount that the diverter wheels can be turned when the rod 130 is retracted. In this manner, the diverter wheels can be adjusted for turning to any desired angle between zero and 45 degrees.

Figure 7:
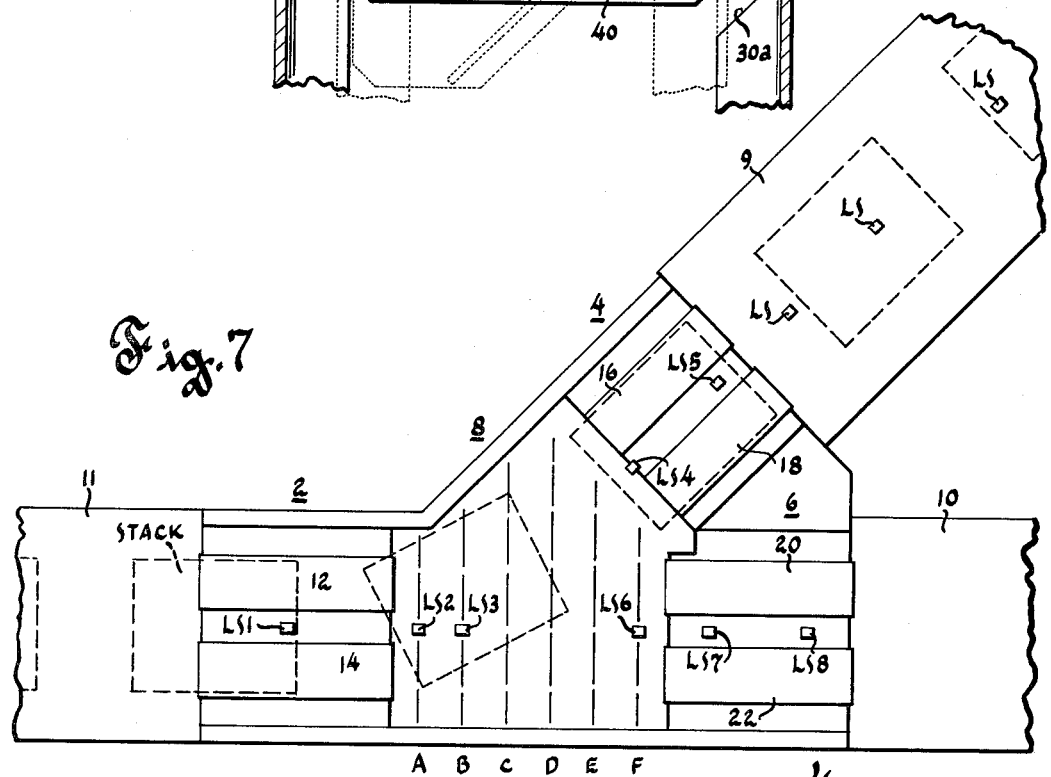
FIG. 7 is a top plan view of the branched conveyor section of FIG. 1 showing the locations of certain limit switches.
Figure 8:
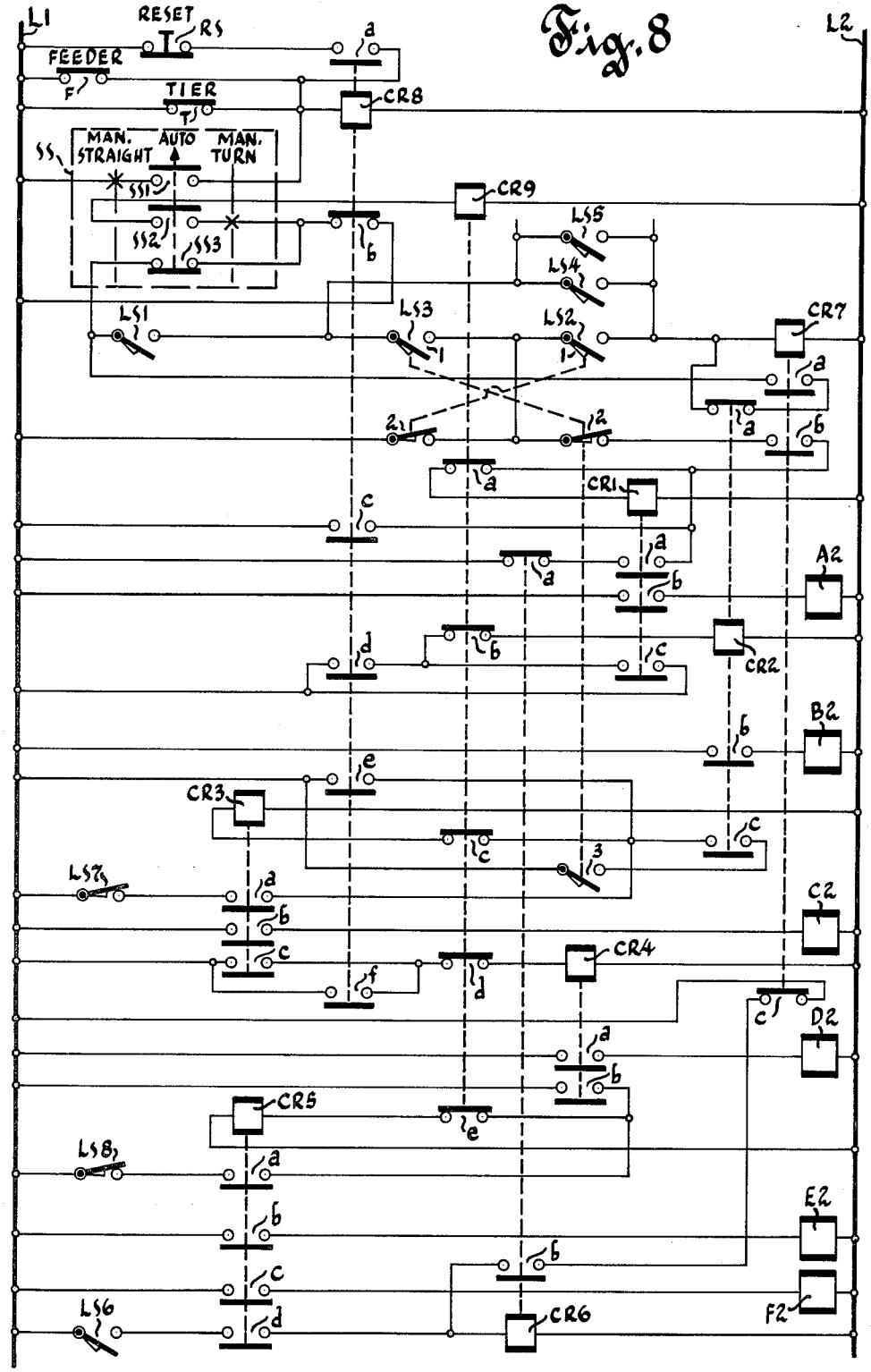
FIG. 8 is a circuit diagram of a control system for the invention.

As shown in FIG. 7, the diverting conveyor section is provided with a plurality of limit switches for controlling operation thereof in response to articles, these limit switches being also shown in the circuit diagram of FIG. 8. A limit switch LS1 is mounted on receiving portion 2 of the conveyor section between conveyor belts 12 and 14 so that it will be actuated by each article arriving from incoming conveyor 11. Limit switches LS2 and LS3 are located beneath rows A and B of the diverter wheels, respectively, for actuation in sequence when the incoming articles engage the corresponding rows of diverter wheels. A limit switch LS4 is mounted between the inner ends of conveyor belts 16 and 18 of the 45-degree angular outlet 4 and a limit switch LS5 is mounted between the outer ends of these conveyor belts for purposes hereinafter described. Since it was hereinbefore assumed that articles are normally conveyed to outlet portion 4 and overflow articles are diverted to outlet portion 6, additional limit switches LS may be spaced along outgoing conveyor 9 as shown in FIG. 7 and each such limit switch may be connected in parallel with limit switch LS5 in FIG. 8. Limit switch LS6 is mounted beneath row F of the diverter wheels. Limit switches LS7 and LS8 are mounted between the inner and outer ends, respectively, of conveyor belts 20 and 22 of outlet portion 6. The function of these limit switches in the control of article routing will become apparent in connection with the description of operation of the circuit diagram shown in FIG. 8.

FIG. 8 shows a control system for the conveyor section. In FIG. 8, lines L1 and L2 are supplied from an alternating current source. This system is provided with a plurality of control relays CR1, CR2, CR3, CR4 and CR5 for energizing solenoids A2, B2, C2, D2 and E2, F2, respectively. As shown at the lower portion of FIG. 8, each of these control relays controls a single solenoid except relay CR5 which controls both solenoids E2 and F2. The solenoids operate the compressed air valves for cylinders 128 in FIG. 3 for actuating the six rows A–F of diverter wheels, respectively, from their angular position to their straight ahead position. A control relay CR6 shown at the lower portion of FIG. 8 is provided for controlling return of the rows of diverting wheels to their angular positions. A control relay CR7 is provided for initiating the turning of the diverting wheels to their straight ahead position. A three position selector switch SS is provided for setting the system for routing all articles straight ahead, for automatic operation to route articles to the angular conveyor and to route overflow articles straight ahead or for routing all articles to the angular conveyor. A control relay CR8 is energized by the selector switch for controlling straight ahead routing and a control relay CR9 is energized by the selector switch for controlling routing of all articles to the angular conveyor as hereinafter described.

The operation of the system will now be described. Let it be assumed that when solenoids A2–F2 are deenergized, rows A–F of diverter wheels will be in their angular positions so as to turn articles to outgoing conveyor 9. Under this condition, actuator rods 130 are retracted to maintain the diverter wheels in their angular positions. Collars 132 shown in FIG. 3 are preferably adjusted on rods 130 so that the diverter wheels of row A are turned 6 degrees from their straight ahead position toward the left or toward outlet portion 4. The wheels of row B are turned 15 degrees, the wheels of row C are turned 35 degrees and the wheels of rows D, E and F are turned 45 degrees toward outgoing conveyor 9. These angles are exemplary and it may be assumed that these angles are selected for optimum turning of stacks of newspapers. Let it also be assumed that selector switch SS is in its auto position so that contact SS1 and SS2 are open and contact SS3 is closed as shown in FIG. 8. Normally closed interlock contacts F and T of the feeder and tying machine, respectively, will be open when the feeder and tying machine are operating properly so that relay CR9 will not be energized.

Since the diverter wheels in row A are turned only six degrees when articles are routed to angular outlet 4, the lower flange of member 30 of this diverter unit does not require either the notches 30a nor the stop members 58. Bent portions 50a of wheel supporting brackets 50 do not engage the lower flange of side member 30 in either the straight ahead position or the 6 degree angular position of the diverter wheels. Thus, all seven diverter wheels in row A are depressible by the bundle in both positions. Consequently, six wheels of row A are driven in either position by the driving wheels therebelow and the middle diverter wheel actuates limit switch LS2. The same is true of the diverter wheels in row B since the 15-degree angular position thereof is not sufficient for bent portions 50a to abut against the lower flange. Thus, seven diverter wheels in row B are driven in both positions whereas the fourth wheel actuates limit switch LS3 when the diverter wheels are depressed by a bundle of newspapers.

In row C, a notch 30a and a stop member 58 is provided on the lower flange of side member 30 for each of the ten diverter wheels so that the wheels can be depressed only in their angular position. The eight driving belts shown in FIG. 3 drive the first eight diverter wheels in their angular position. The other two wheels are also made depressible since driving means are not provided and they need not be maintained disengaged therefrom. In the straight ahead position, the wheels will not be driven because only angular driving belts are provided for this row. However, the driven wheels in the adjacent rows B and D will move the bundle straight ahead over row C.

In row D, the first two diverter wheels are not provided with such notches or stops but the other ten diverter wheels are provided therewith. In the straight position, the first two wheels will be depressed and driven by the two driving wheels therebelow. In the angular position, bent portion 50a abuts against the lower flange of side member 30 to maintain the first two wheels out of engagement with the driving wheels. In the angular position, the other ten wheels will be depressed and eight of these wheels will be driven by the V-belts. In the straight ahead position, these ten wheels will be maintained out of engagement with the driving belts by stop members 58.

In row E, the first four diverter wheels are not provided with such notches or stops but the other six wheels are provided therewith. The first three wheels are driven only in their straight ahead position since there is no room for a fourth driving wheel. The other six wheels are driven by the first six of the driving belts.

In a similar manner, in row F only the last two diverter wheels are provided with such notches and stop members. Thus, the first three diverter wheels and the fifth and sixth ones are driven only in their straight ahead position and the fourth wheel actuates limit switch LS6. The last two diverter wheels are driven only in their angular position by the first two V-belts.

Conveyor belts 12 and 14 are arranged to run faster than incoming conveyor 11 so that the bundles which are fifteen inches long are spaced apart a predetermined distance such as at least nine inches or the like. As bundles arriving along incoming conveyor 11 in adjacent relation reach receiving conveyor 2, they are speeded up by conveyor belts 12 and 14 so that each leading bundle becomes spaced from the next bundle at least nine inches. The bundles then are turned and diverted by the rows of diverter wheels to outlet portion 4 and pass therefrom through feeder conveyor 9 to a tying machine. It may be assumed that the tying machine controls feeder conveyor 9 so that the bundles are fed into the tying machine at the rate at which it can tie them. For example, the tying machine may control the speed of feeder conveyor 9 or may intermittently stop and start the bundles on feeder conveyor 9 so that each bundle will be fed into the tying machine only after the tying machine is prepared to receive it.

If the 45 degree angular outlet portion 4 becomes too crowded to accept another bundle, the system will automatically convey subsequent bundles in the straight ahead direction to overflow outlet portion 10 in the following manner. Such condition is indicated by actuation of limit switch LS1 while limit switches LS2 and LS3, or LS4 or LS5 are in their actuated condition. When bundles pass on these limit switches, as shown in FIG. 7, a predetermined condition is present wherein the angular outlet branch should accept no more bundles. Thus, the next bundle to engage limit switch LS1 causes operation thereof to energize relay CR7 in FIG. 8a. The circuit for relay CR7 extends from line L1 through contact b of relay CR8, contact SS3 of selector switch SS, limit switch LS1 and then in one branch through contacts 1 of limit switches LS3 and LS2, or in a second branch through limit switch LS4 or in a third branch through limit switch LS5 or additional parallel limit switch LS branches as hereinbefore mentioned.

Relay CR7 closes its contact a to complete through contact a of relay CR2 a self-maintaining circuit in shunt of the aforementioned limit switches. Relay CR8 also closes its contact b to prepare a circuit for relay CR1 and opens its contact c to open the maintaining circuit of relay CR6.

As the bundle which was on rows A and B of diverter wheels moves off, limit switches LS2 and LS3 restore to close contacts 2 thereof whereby to energize relay CR1. The circuit for relay CR1 extends from line L1 through contacts 2 of limit switches LS2 and LS3, contact b of relay CR7 and contact a of relay CR9 to line L2. Relay CR1 closes its contact a to complete through contact a of relay CR6 a self-maintaining circuit in shunt of the contacts of limit switches LS2 and LS3 and relay CR7. Relay CR1 also closes its contact b to energize solenoid A2 which operates the compressed air valve to cause the cylinder to pivot row A of diverter wheels to their straight ahead position. Relay CR1 further closes its contact c to energize relay CR2 in a circuit extending also through contact b of relay CR9 across lines L1 and L2.

Limit switches LS2 and LS3 upon restoration as aforementioned also open their contacts 1 without effect since relay CR7 is self-maintained. Limit switch LS3 also opens its contact 3 to delay operation of relay CR3 until the bundle going straight ahead engages row B of diverter wheels as hereinafter described.

Relay CR2 when energized as aforesaid, opens its contact a to deenergize relay CR7 by opening the self-maintaining circuit of the latter. Since relay CR1 is self-maintained energized, relay CR7 may be restored at this time. Relay CR2 closes its contact b to energize solenoid B2 and closes its contact c to prepare a circuit for relay CR3. Solenoid B2 causes row B of diverter wheels to be turned to the straight ahead position so that the bundle will travel thereover toward outlet branch 6.

When the bundle engages row B of diverter wheels limit switch LS3 will be operated to close its contact 3 to energize relay CR3. This circuit extends from line L1 through contact 3 of limit switch LS3 and contacts c of relays CR2 and CR9, respectively, and the coil of relay CR3 to line L2. Relay CR3 closes its contact a to complete through limit switch LS7 a self-maintaining circuit in shunt of contact 3 of limit switch LS3 and contact c of relay CR2. Relay CR3 closes its contact b to energize solenoid C2 thereby to turn the third row C of diverter wheels straight ahead in time to receive the bundle. Relay CR3 also closes its contact c to energize relay CR4 through contact d of relay CR9 across lines L1 and L2. Relay CR4 closes its contact a to energize solenoid D2 thereby to turn row D of diverter wheels straight ahead in time to receive the bundle. Relay CR4 also closes its contact b to energize relay CR5 through contact e of relay CR9 across lines L1 and L2. Relay CR5 closes its contact a to complete through limit switch LS8 a self-maintaining circuit in shunt of contact b of relay CR4. Relay CR5 also closes its contacts b and c to energize solenoids E2 and F2 across lines L1 and L2. As a result, these two solenoids cause rows E and F of diverter wheels to turn to their straight ahead position. Relay CR5 further closes its contact d to prepare relay CR6 for operation.

It will be apparent from the foregoing description that the diverting conveyor section routes articles to the 45 degree branch so long as the processing device such as a bundle tier is capable of receiving them. When an overcrowded condition occurs on the 45 degree angle conveyor, the next article to engage limit switch LS1 will be routed straight ahead to the overflow conveyor branch. As hereinbefore described this diversion is accomplished by turning the six rows of skate wheel diverters in steps. The first two rows A and B are turned when the article that was on rows A and B leaves such rows. And the third, fourth, fifth and sixth rows C, D, E and F are turned when the article to be diverted engages row B of diverter wheels. This stepped turning of the rows of diverter wheels allows the article preceding the diverted article to go into the 45-degree conveyor without interference. That is, by the time the last four rows of skate wheels are turned to their straight ahead position, the article preceding the diverted article will have reached conveyor belts 16 and 18 so that it will continue into the angular conveyor whereas the following article goes straight ahead toward outlet branch 6 and outgoing conveyor 10.

The system in FIG. 8 is arranged so that the rows of diverting wheels will be automatically restored to their angular positions to route subsequent articles to the angular outlet portion 4 in the event the latter has been cleared of articles so that it is capable of receiving another article. This restoration is performed under the control of the article that was routed straight ahead. When this article moves straight ahead and engages row F of diverter wheels, limit switch LS6 in the lower left-hand portion of FIG. 8 is closed to energize relay CR6 through contact d of relay CR5 across lines L1 and L2. It will be apparent that relay CR6 cannot be energized until all of the solenoid controlling relays including relay CR5 have been energized. This prevents restoration of any of the rows of diverter wheels to their angular position before all of them have put into straight ahead position thereby to maintain proper order of turning of the rows of diverter wheels. Relay CR6 opens its contact a to interrupt the maintaining circuit of relay CR1. Relay CR6 also closes its contact b to complete a self-maintaining circuit through contact c of relay CR7. Relay CR1 deenergizes and opens its contact a further to interrupt its maintaining circuit, opens its contact b to deenergize solenoid A2 and opens its contact c to deenergize relay CR2.

Relay CR2 opens its contact b to deenergize solenoid B2 and opens its contact c in the energizing circuit of relay CR3, the latter being maintained by limit switch LS7. The aforementioned deenergization of solenoids A2 and B2 causes operation of the corresponding air valves to turn rows A and B of diverter wheels back to their angular positions. Relay CR2 also recloses its contact a in the maintaining circuit of relay CR7.

The arrangement in FIGS. 7 and 8 is such that at the time the bundle going straight ahead closes limit switch LS6, the next bundle has not yet reached row A of diverter wheels. Therefore, it will be apparent that the restoration of rows A and B of the diverter wheels back to their angular positions established a condition whereby the next bundle will be routed to the angular outlet 4. The reclosure of contact *a* of relay CR2 established a condition whereby such next bundle can be routed straight ahead if angular outlet 4 is still overcrowded so that it should not receive such next bundle.

Assuming that angular outlet 4 has been cleared of bundles, the bundle going straight ahead next opens limit switch LS7 to interrupt the maintaining circuit of relay CR3 and to deenergize the same. Relay CR3 opens its contact *a* in its maintaining circuit, opens its contact *b* to deenergize solenoid C and opens its contact *c* to deenergize relay CR4. Solenoid C2 restores row C of diverter wheels to their angular position. Relay CR4 opens its contact *a* to deenergize solenoid D2 and opens its contact *b* in the energizing circuit of relay CR5, the latter being maintained by limit switch LS8. Solenoid D2 restores row D of diverter wheels to their angular position.

When the bundle going straight ahead next opens limit switch LS8, relay CR5 is deenergized. Relay CR5 opens its contact *a* in its maintaining circuit and opens its contacts *b* and *c* to deenergize solenoids E2 and F2. As a result, the last two rows E and F of diverter wheels are restored to their angular positions.

It will be apparent from the foregoing description that the six rows of diverter wheels are restored to their angular positions in steps. When the bundle passes over limit switches LS6, LS7 and LS8, limit switch LS6 restores rows A and B, then limit switch LS7 restores rows C and D and finally after the bundle has passed completely over row F of diverter wheels, limit switch LS8 restores rows E and F to their angular position. Subsequent bundles again are routed to the angular conveyor outlet 4. If outlet 4 becomes overcrowded, the system operates as hereinbefore described to route one or more bundles straight ahead to outlet 6.

Let it be assumed that outlet 4 has not been cleared of bundles at the time that the first bundle going straight ahead closes limit switch LS6. Under this condition, relays CR1 through CR5 and solenoids A2 through F2 are energized. The uncleared condition is indicated by a bundle actuating limit switch LS4 or LS5 when another bundle closes limit switch LS1. Any one of limit switches LS on conveyor 9 could also indicate such uncleared condition if connected in parallel with limit switch LS5.

When limit switch LS6 is closed as aforesaid by the bundle going straight ahead, relay CR6 deenergizes relay CR1 and the latter deenergizes relay CR 2 whereby solenoids A2 and B2 restore rows A and B of diverter wheels to their angular positions preparatory to turning the next bundle to outlet 4 as hereinbefore described. Relay CR2 recloses its contact *a* in the maintaining circuit of relay CR7. The limit switches such as LS1 and LS4 which detect the uncleared condition of angular outlet 4 energize relay CR7 which is self-maintained as before. Relays CR1 and CR2 are then energized as hereinbefore described and energize solenoids A2 and B2 to turn rows A and B of the diverter wheels straight ahead. Although the bundle going straight ahead opens limit switches LS7 and LS8 to restore the other rows of wheels to angular positions, the incoming bundle engages limit switch LS3 to turn these rows of wheels straight ahead again. Therefore, as long as the crowded condition exists, each bundle going straight ahead restores the diverter wheels to their angular positions but the next bundle again turns them straight ahead. Thus, successive bundles go straight ahead if the overcrowded condition perists on the angular outlet.

If it is desired to route all the bundles straight ahead, selector switch SS is turned to its manual-straight position to close contact SS1 and to open contact SS3. This energizes relay CR8 which is maintained through its contact *a* and reset switch RS. Relay CR8 opens its contact *b* to prevent operation of relays CR7 and CR9. Relay CR8 closes contacts *c*, *d*, *e*, and *f* to energize relays CR1 through CR5 and to energize solenoids A2 through F2. As a result, the rows A–F of diverter wheels are held in their straight ahead positions. Reset switch RS must be pressed to deenergize relay CR8.

If it is desired to route all articles to angular outlet 4, selector switch SS is turned to its manual-turn position to close contact SS2 and to open contact SS3 and reset switch RS is pressed. This energizes relay CR9 and opens contacts *a* through *e* thereof to open the circuits of relays CR1 through CR5. As a result, solenoids A2–F2 remain deenergized to route all articles to the angular branch outlet.

If the feeder which feeds bundles to the tier stops operating or if its power is disconnected or fails, contact F closes to energize relay CR8 thereby to route all bundles straight ahead as hereinbefore described in connection with manual-straight operation. Likewise, if the tier power is disconnected or fails, contact T closes to route all bundles straight ahead as hereinbefore described in connection with manual-straight operation. As will be apparent, either contact F or T can bypass contact SS1 of the selector switch under these abnormal conditions.

While the system hereinbefore described is effectively adapted to fulfill the objects stated, it is to be understood that we do not intend to confine our invention to the particular preferred embodiment of diverting conveyor system disclosed, inasmuch as it is susceptible of various modifications without departing from the scope of the appended claims. For example, the diverting conveyor system is not restricted to control by limit switches, but in a broader aspect may be controlled by programming signals or the like indicative of a condition that a tier is not available.

We claim:

1. In a diverting conveyor system having an incoming conveyor and two diverging outgoing conveyors, the improvement comprising:
   a diverting device for receiving articles from the incoming conveyor and for routing them to one or the other selected outgoing conveyor, said diverting device comprising:
      a plurality of rows of diverter wheels;
      control means for turning said wheels in situ to different angular positions so that each wheel turns on a vertical axis individual thereto whereby they will convey articles to the selected outgoing conveyor;
      and driving means for rotating at least some of the wheels in said rows in either of said positions whereby to move the articles thereover.

2. A diverting conveyor system having an incoming conveyor and two diverging outgoing conveyors, the improvement comprising:
   a diverting device for receiving articles from the incoming conveyor and for routing them to one or the other selected outgoing conveyor, said diverting device comprising:
      a plurality of rows of diverter wheels;
      control means for turning said wheels to different angular positions so that they will convey articles to the selected outgoing conveyor;
      and driving means for rotating at least some of the wheels in said rows in either of said positions whereby to move the articles thereover;
      said driving means comprising:
         a plurality of driving devices mounted below the rows of diverter wheels for frictionally engaging the lower peripheries of the wheels thereby to drive the same.

3. A diverting conveyor system having an incoming conveyor and two diverging outgoing conveyors, the improvement comprising:
  a diverting device for receiving articles from the incoming conveyor and for routing them to one or the other selected outgoing conveyor, said diverting device comprising:
    a plurality of rows of diverter wheels;
    control means for turning said wheels to different angular positions so that they will convey articles to the selected outgoing conveyor;
    and driving means for rotating at least some of the wheels in said rows in either of said positions whereby to move the articles thereover;
    said driving means comprising:
      a plurality of driving belts mounted below the rows of wheels for frictionally engaging the lower peripheries thereof to rotate the wheels in one of said angular positions.

4. A diverting conveyor system having an incoming conveyor and two diverging outgoing conveyors, the improvement comprising:
  a diverting device for receiving articles from the incoming conveyor and for routing them to one or the other selected outgoing conveyor, said diverting device comprising:
    a plurality of rows of diverter wheels;
    control means for turning said wheels to different angular positions so that they will convey articles to the selected outgoing conveyor;
    and driving means for rotating at least some of the wheels in said rows in either of said positions whereby to move the articles thereover;
    said driving means comprising:
      a plurality of driving wheels mounted below the rows of diverter wheels for frictionally engaging the lower peripheries of the latter to rotate the diverter wheels in one of said angular positions.

5. A diverting conveyor system having an incoming conveyor and two diverging outgoing conveyors, the improvement comprising:
  a diverting device for receiving articles from the incoming conveyor and for routing them to one or the other selecting outgoing conveyor, said diverting device comprising:
    a plurality of rows of diverter wheels;
    control means for turning said wheels to different angular positions so that they will convey articles to the selected outgoing conveyor;
    and driving means for rotating at least some of the wheels in said rows in either of said positions whereby to move the articles thereover;
    one of said angular positions being a straight ahead position and in the other angular position the wheels of each row being at a predetermined angle relative to the straight ahead position, and said driving means comprising:
      driving wheels for driving some of the diverter wheels in their straight ahead position;
      and driving belts for driving others of said diverter wheels in said predetermined angular position.

6. The invention defined in claim 5, together with: means for preventing the diverter wheels which are driven in their straight ahead position from engaging the associated driving wheels when these diverter wheels are turned to said predetermined angular position.

7. The invention defined in claim 5, together with: means for preventing the diverter wheels which are driven in their predetermined angular position from engaging the associated driving belts when these diverter wheels are in their straight ahead position.

8. A diverting conveyor system having an incoming conveyor and two diverging outgoing conveyors, the improvement comprising:
  a diverting device for receiving articles from the incoming conveyor and for routing them to one or the other selected outgoing conveyor, said diverting device comprising:
    a plurality of rows of diverter wheels;
    control means for turning said wheels to different angular positions so that they will convey articles to the selected outgoing conveyor;
    and driving means for rotating at least some of the wheels in said rows in either of said positions whereby to move the articles thereover;
    said control means comprising:
      means for detecting a condition wherein the selected outgoing conveyor to which articles are being routed is overcrowded with articles;
      and means responsive to said detecting means for turning said diverter wheels for delivery of subsequent articles to the other outgoing conveyor.

9. A diverting conveyor system having an incoming conveyor and two diverging outgoing conveyors, the improvement comprising:
  a diverting device for receiving articles from the incoming conveyor and for routing them to one or the other selected outgoing conveyor, said diverting device comprising:
    a plurality of rows of diverter wheels;
    control means for turning said wheels to different angular positions so that they will convey articles to the selected outgoing conveyor;
    and driving means for rotating at least some of the wheels in said rows in either of said positions whereby to move the articles thereover;
    said control means comprising:
      a selector switch settable to select the outgoing conveyor to which articles are to be routed;
      means responsive to said selector switch in one position thereof for controlling said diverting device to route all incoming articles to one outgoing conveyor;
      and means responsive to said selector switch in another position thereof to route all incoming articles to the other outgoing conveyor.

10. The invention defined in claim 9, wherein said control means also comprises:
  means reponsive to said selector switch in a third position thereof for controlling said diverting device to route all articles to one outgoing conveyor so long as it is not overcrowded;
  and means responsive to detection of an overcrowded condition of said one outgoing conveyor for controlling said diverting device to route the next article to the other outgoing conveyor.

11. The invention defined in claim 10, together with: means operable when said overcrowded condition has terminated for controlling said diverting device to restore routing of subsequent articles to said one outgoing conveyor.

12. A diverting conveyor system having an incoming conveyor and two diverging outgoing conveyors, the improvement comprising:
  a diverting device for receiving articles from the incoming conveyor and for routing them to one or the other selected outgoing conveyor as desired, said diverting device comprising:
    a plurality of rows of diverter wheels normally set in a first angular condition whereby to convey articles to a first one of the outgoing conveyors;
    and control means for turning said rows of wheels to a different angular condition whereby to convey articles to the second outgoing conveyor; said control means comprising:

means for turning said rows of wheels in a plurality of sequential steps so that an article which has started toward the first outgoing conveyor will continue thereto and the next article will be routed to the other outgoing conveyor.

13. In a conveyor system having an incoming conveyor and two outgoing conveyors, the improvement comprising:

a diverting conveyor section between said incoming conveyor and said outgoing conveyors for receiving articles from the former and for routing them to one or the other selected outgoing conveyor; said diverting conveyor section comprising:

a plurality of rows of diverter wheels;

control means for turning the wheels in said rows to different angular positions so that they will convey articles to one of said outgoing conveyors when in one angular position and will convey articles to the other outgoing conveyor when in the other angular position;

two sets of driving means for rotatably driving groups of said wheels in the respective angular positions thereof;

and means for preventing the group of wheels that is driven in each angular position from being driven in the other angular position.

References Cited by the Examiner

UNITED STATES PATENTS

| | | | |
|---|---|---|---|
| 1,968,547 | 7/1934 | Yost | 198—38 |
| 2,136,267 | 11/1938 | Taylor | 198—81 X |
| 3,105,601 | 10/1963 | Smoll | 198—38 X |
| 3,174,613 | 3/1965 | Insolio. | |

HUGO O. SCHULZ, *Primary Examiner.*

EDWARD A. SROKA, SAMUEL F. COLEMAN,
*Examiners.*